(12) United States Patent
Miller et al.

(10) Patent No.: US 9,898,852 B2
(45) Date of Patent: Feb. 20, 2018

(54) PROVIDING A REAL-TIME SHARED VIEWING EXPERIENCE IN A THREE-DIMENSIONAL MODELING ENVIRONMENT

(71) Applicant: TRIMBLE NAVIGATION LIMITED, Sunnyvale, CA (US)

(72) Inventors: Tyler Miller, Denver, CO (US); John M. Bacus, Boulder, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 522 days.

(21) Appl. No.: 13/676,323

(22) Filed: Nov. 14, 2012

(65) Prior Publication Data
US 2013/0120367 A1  May 16, 2013

Related U.S. Application Data

(60) Provisional application No. 61/560,096, filed on Nov. 15, 2011.

(51) Int. Cl.
*G06T 15/00* (2011.01)
*G06T 15/20* (2011.01)
*G06T 19/00* (2011.01)

(52) U.S. Cl.
CPC .............. *G06T 15/00* (2013.01); *G06T 15/20* (2013.01); *G06T 19/00* (2013.01); *G06T 2219/024* (2013.01)

(58) Field of Classification Search
CPC ......... G06T 15/00; G06T 15/20; G06T 19/00; G06T 2219/024

(Continued)

(56) References Cited

U.S. PATENT DOCUMENTS 6,058,397 A     5/2000  Barrus et al.
6,158,903 A  *  12/2000 Schaeffer ............ H04L 67/1095
                                                                 709/204

(Continued)

FOREIGN PATENT DOCUMENTS

CA    2781638    6/2011
EP    0899695    3/1999

(Continued)

OTHER PUBLICATIONS

International Search Report for International (PCT) Patent Application No. PCT/US2012/064926, mailed Mar. 29, 2013 3 pages.

(Continued)

*Primary Examiner* — Gregory J Tryder
*Assistant Examiner* — Michael Le
(74) *Attorney, Agent, or Firm* — Sheridan Ross P.C.

(57) ABSTRACT

When multiple users simultaneously view and/or collaboratively develop a three-dimensional (3D) model using respective independent computing devices, one of the participating users may locally modify a viewpoint of the 3D model, and the viewpoint changes are automatically propagated in real-time to the other users. A viewpoint may correspond to a positioning, an orientation, a zoom degree, an angle, etc. of the 3D model as would be provided by a virtual camera trained on the 3D model. The multiple users may share a common viewpoint of the 3D model in real-time in addition to viewing and/or participating in the generation and modification of the 3D model in real-time. In an embodiment, only one user at a time may be allowed to control the viewpoint modification of the 3D model.

20 Claims, 6 Drawing Sheets

(58) Field of Classification Search
USPC .......................................................... 345/419
See application file for complete search history.

(56) References Cited

U.S. PATENT DOCUMENTS

| | | | |
|---|---|---|---|
| 7,092,907 B2 | 8/2006 | Kanevsky et al. | |
| 7,139,444 B2 | 11/2006 | Ameline et al. | |
| 7,200,639 B1 | 4/2007 | Yoshida | |
| 7,516,132 B1* | 4/2009 | Fast .................... | H04L 67/1095 |
| 7,917,584 B2* | 3/2011 | Arthursson ........... | G06F 3/0486 |
| | | | 455/558 |
| 8,311,894 B2* | 11/2012 | Nykamp ................ | G06Q 10/10 |
| | | | 705/26.1 |
| 2002/0069215 A1* | 6/2002 | Orbanes ................ | G06F 3/0346 |
| | | | 715/233 |
| 2002/0154144 A1 | 10/2002 | Lofgren et al. | |
| 2003/0021439 A1 | 1/2003 | Lubin et al. | |
| 2003/0090530 A1 | 5/2003 | Ramani | |
| 2003/0135557 A1* | 7/2003 | Davis .................. | G06F 17/2288 |
| | | | 709/206 |
| 2004/0068187 A1 | 4/2004 | Krause et al. | |
| 2004/0153824 A1* | 8/2004 | Devarajan ............... | G06T 17/00 |
| | | | 714/38.1 |
| 2004/0239679 A1 | 12/2004 | Ito et al. | |
| 2005/0081161 A1 | 4/2005 | MacInnes et al. | |
| 2005/0131659 A1* | 6/2005 | Mei ......................... | G06T 17/10 |
| | | | 703/1 |
| 2005/0165859 A1 | 7/2005 | Geyer et al. | |
| 2006/0066609 A1 | 3/2006 | Iodice et al. | |
| 2006/0119601 A1 | 6/2006 | Finlayson et al. | |
| 2006/0250418 A1 | 11/2006 | Chartier et al. | |
| 2007/0171790 A1 | 7/2007 | Kim et al. | |
| 2007/0174027 A1 | 7/2007 | Moiseyev | |
| 2008/0028323 A1 | 1/2008 | Rosen et al. | |
| 2008/0046828 A1 | 2/2008 | Bibliowicz et al. | |
| 2008/0140732 A1 | 6/2008 | Wilson et al. | |
| 2008/0141334 A1 | 6/2008 | Wicker et al. | |
| 2008/0229234 A1 | 9/2008 | Astolfi et al. | |
| 2009/0046094 A1 | 2/2009 | Hamilton, II et al. | |
| 2009/0077119 A1 | 3/2009 | Speth et al. | |
| 2009/0141023 A1 | 6/2009 | Shuster | |
| 2009/0237411 A1 | 9/2009 | Gossweiler et al. | |
| 2010/0013842 A1 | 1/2010 | Green et al. | |
| 2010/0017461 A1 | 1/2010 | Kokkevis et al. | |
| 2010/0030578 A1* | 2/2010 | Siddique ............. | G06Q 10/0637 |
| | | | 705/3 |
| 2010/0031196 A1 | 2/2010 | Ordody | |
| 2010/0045662 A1 | 2/2010 | Boothroyd et al. | |
| 2010/0118039 A1 | 5/2010 | Labour | |
| 2010/0146085 A1 | 6/2010 | Van Wie et al. | |
| 2010/0198563 A1 | 8/2010 | Plewe | |
| 2011/0025688 A1* | 2/2011 | Schneider ............... | G06T 19/20 |
| | | | 345/420 |
| 2011/0153368 A1 | 6/2011 | Pierre et al. | |
| 2011/0169826 A1 | 7/2011 | Elsberg et al. | |
| 2012/0054261 A1 | 3/2012 | Evans et al. | |
| 2012/0109591 A1 | 5/2012 | Thompson et al. | |
| 2012/0117145 A1 | 5/2012 | Clift et al. | |
| 2012/0331061 A1 | 12/2012 | Lininger | |
| 2013/0035904 A1* | 2/2013 | Kuhn .................. | G06F 17/5004 |
| | | | 703/1 |
| 2013/0120368 A1 | 5/2013 | Miller et al. | |
| 2013/0120369 A1 | 5/2013 | Miller et al. | |
| 2013/0132466 A1 | 5/2013 | Miller et al. | |
| 2013/0144566 A1 | 6/2013 | De Biswas | |
| 2014/0033265 A1 | 1/2014 | Leeds et al. | |

FOREIGN PATENT DOCUMENTS

| | | |
|---|---|---|
| EP | 1004068 | 5/2000 |
| EP | 2352120 | 8/2011 |
| JP | 2001-229401 | 8/2001 |
| JP | 2003-099805 | 4/2003 |
| JP | 2005-269280 | 9/2005 |
| WO | WO 2008/041061 | 4/2008 |
| WO | WO 2010/035266 | 4/2010 |

OTHER PUBLICATIONS

International Preliminary Report on Patentability for International (PCT) Patent Application No. PCT/US2012/064926, mailed May 30, 2014 6 pages.
International Search Report and Written Opinion for International (PCT) Patent Application No. PCT/US2012/064931, mailed Mar. 13, 2013 9 pages.
International Preliminary Report on Patentability for International (PCT) Patent Application No. PCT/US2012/064931, mailed Jun. 5, 2014 6 pages.
International Search Report and Written Opinion for International (PCT) Patent Application No. PCT/US2012/064932, mailed Mar. 22, 2013 11 pages.
International Preliminary Report on Patentability for International (PCT) Patent Application No. PCT/US2012/064932, mailed May 30, 2014 8 pages.
International Search Report and Written Opinion for International (PCT) Patent Application No. PCT/US2012/064940, mailed Mar. 26, 2013 9 pages.
International Preliminary Report on Patentability for Intenational (PCT) Patent Application No. PCT?US2012/064940, mailed May 30, 2014 8 pages.
International Search Report and Written Opinion for Application No. PCT/US2012/044297, dated Dec. 27, 2012.
International Preliminary Report on Patentability for International (PCT) Patent Application No. PCT/US2012/044297, mailed Jan. 16, 2014 8 pages.
Official Action for U.S. Appl. No. 13/159,705, mailed Jul. 16, 2013.
Official Action for U.S. Appl. No. 13/159,705, mailed Mar. 20, 2014.
Official Action for U.S. Appl. No. 13/676,340, mailed Jan. 6, 2015 20 pages.
Official Action for U.S. Appl. No. 13/676,330, mailed Nov. 19, 2014 28 pages.
Official Action for U.S. Appl. No. 13/169,705, mailed Oct. 21, 2014 12 pages.
"Collaborative real-time editor" Wikipedia, the free encyclopedia, Nov. 7, 2011, 7 pages [retrieved from: http://en.wikipedia.org/w/index.php?title=Coliaborative_real-time_editor&oldid=459190583].
Agustina et al. "CoMaya," Proceedings of the ACM 2008 Conference on Computer Supported Cooperative Work, CSCW '08, Jan. 1, 2008, pp. 5-8, XP055163225, ISBN: 978-1-60-558007-4.
Ammon et al., "Collaboration on Scene Graph Based 3D Data," from Advances in Computer Graphics and Computer Vision: Int'l Conferences VISAPP and GRAPP 2006, Braz et al. (eds), Springer-Verlag, 2007, pp. 78-90.
Koller et al. "Research Challenges for Digital Archives of 3D Cultural Heritage Models," ACM Journal on Computing and Cultural Heritage, Dec. 2009, vol. 2, No. 3, Article 7, 17 pages.
Ku et al, "3D Model-Based Collaboration in Design Development and Construction of Complex Shaped Buildings," Itcon, 2008, vol. 13, pp. 458-485.
Ohbuchi et al. "Watermarking Three-Dimensional Polygonal Models," Proceedings of the Fifth ACRM Internal Conference on Multimedia, 1997, pp. 261-272.
Shaojin et al. "An asynchronous CAD collaborative design model," Computer Application and System Modeling (ICCASM), 2010 International Conference on, IEEE, Piscataway, NJ, USA, Oct. 22, 2010, pp. V6-563-V6-568, XP031789329, ISBN: 978-1-4244-7235-2.
Sohn et al. "User transparent 3D watermarking system based on security policy," International conference on Cyberworlds, Oct. 2007, pp. 89-92.
Sun et al. "Transparent adaptation of single-user applications for multi-user real-time collaboration," ACM Transactions on Com-

(56) References Cited

OTHER PUBLICATIONS puter-Human Interaction, Dec. 1, 2006, vol. 13, No. 4 • pp. 531-552, XP055163216, ISSN: 1073-0516.
Extended Search Report for European Patent Application No. 12849377.2, dated May 18. 2015 6 pages.
Extended Search Report for European Patent Application No. 12851259.7, dated May 4, 2015 6 pages.
Extended European Search Report for European Patent Application No. 12850623.5, dated Dec. 3, 2015, 7 pages.
Extended Search Report for European Patent Application No. 12850450.3, dated Jul. 15, 2015 8 pages.
Extended Search Report for European Patent Application No. 12804395.7, dated Jan. 28, 2015 12 pages.
Official Action for U.S. Appl. No. 13/676,340, dated Aug. 12, 2015 28 pages.
Official Action for U.S. Appl. No. 13/676,340, dated Dec. 22, 2015 31 pages.
Official Action for U.S. Appl. No. 13/676,340, dated Jul. 25, 2016 31 pages.
Official Action for U.S. Appl. No. 13/676,330, dated Apr. 21, 2015 34 pages.
Notice of Allowance for U.S. Appl. No. 13/676,330, dated Aug. 10, 2015 8 pages.
Notice of Allowance for U.S. Appl. No. 13/676,330, dated Jun. 3, 2016 9 pages.
Official Action for U.S. Appl. No. 13/676,338, dated Mar. 31, 2015 38 pages.
Notice of Allowance for U.S. Appl. No. 13/676,338, dated Aug. 12, 2015 12 pages.
Official Action for U.S. Appl. No. 13/169,705, dated May 6, 2015 12 pages.
Notice of Allowance for U.S. Appl. No. 13/169,705, dated Sep. 1, 2015 7 pages.
Notice of Allowance for U.S. Appl. No. 13/169,705, dated Dec. 21, 2015 5 pages.
Official Action for European Patent Application No. 12849377.2, dated Oct. 10, 2016 4 pages.
Intention to Grant for European Patent Application No. 12849377.2, dated Jul. 3, 2017 86 pages.
Action for European Patent Application No. 12851259.7, dated Dec. 12, 2016 4 pages.
Official Action for U.S. Appl. No. 13/676,340, dated Mar. 31, 2017 32 pages.
Official Action for U.S. Appl. No. 13/676,340, dated Jun. 28, 2017 32 pages.

\* cited by examiner

PROVIDING A REAL-TIME SHARED VIEWING EXPERIENCE IN A THREE-DIMENSIONAL MODELING ENVIRONMENT

CROSS REFERENCE TO RELATED APPLICATIONS

This application claims the benefit of U.S. Provisional Patent Application No. 61/560,096, filed on Nov. 15, 2011, entitled "Providing Real-Time Shared Viewing Experience in a Three-Dimensional Modeling Environment," the disclosure of which is hereby expressly incorporated herein by reference.

FIELD OF THE DISCLOSURE

This disclosure relates to developing a three-dimensional (3D) model of an object or a group of objects and, in particular, to providing a real-time shared viewing experience of a 3D model in a 3D modeling environment.

This disclosure is related to U.S. patent application Ser. No. 13/169,705, entitled "Collaborative Development of a Model on a Network" and filed Jun. 27, 2011, the entire disclosure of which is incorporated by reference herein.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, professional as well as non-professional users in a variety of different fields, such as engineering, architecture, automotive design, graphic design, advertising, fashion design, medicine, etc., can develop three-dimensional (3D) models of buildings, vehicles, and other objects using 3D modeling software that operates on a computing device. A user typically interacts with 3D modeling software via input devices such as a keyboard, mouse, trackball, and/or stylus, and the drafting document is displayed on a graphical display device, such as a computer monitor or screen.

In general, 3D modeling software allows a user to draw various three-dimensional shapes (either directly and/or by defining two-dimensional (2D) faces that make up 3D shapes), apply colors and/or textures to the shapes, move, scale, rotate, and skew the shapes, etc. 3D software typically provides the user with stock shapes (e.g., 3D shapes such as spheres or parallelepipeds and/or 2D shapes such as arcs, circles, rectangles, and other known geometric shapes) and/or provides tools to create such shapes. Further, 3D modeling software typically allows users to save models as files that conform to a certain predefined format. To share models, users transmit to each other files with the corresponding model data, or upload the files to data servers.

Users usually develop 3D models by sequentially entering various drawing and image manipulation commands via a graphical user interface (GUI). For example, to model a two-story building, a user may first draw a four-wall structure, draw a door in one of the walls, then draw several windows in the walls, etc. The user may then paint or texture the walls, the roof, and other portions of the model. Accordingly, it may take a significant amount of time for a single user to develop a complex and detailed model.

Collaboratively developing a 3D model includes simultaneously (or essentially simultaneously) developing a same 3D model with input from multiple users at multiple computing devices during a same time interval. While collaboratively displaying and/or collaboratively developing a 3D model, in order to point out particular aspects to other users, a particular user typically refers to specific points of reference of the 3D model by describing the location using human language using a telephone, email, chat or other such mechanisms.

SUMMARY

In an embodiment, a method for facilitating a real-time shared viewing experience in a three-dimensional (3D) modeling environment includes receiving a local viewpoint modification indication indicating that a viewpoint of a three-dimensional (3D) model has been locally modified at a first computing device. The 3D model may be represented by model data that includes component data corresponding to a plurality of respective components of the 3D model, and the component data may include element data representing a plurality of respective sets of edges and faces corresponding to the plurality of respective components. The viewpoint of the 3D model may correspond to a positioning of a rendering of the 3D model relative to a plane of a display device at the first computing device, and the rendering may be based on the model data. In an embodiment, the method includes generating, in response to the received local viewpoint modification indication, a viewpoint update indication descriptive of the modified viewpoint. The method may further include causing the viewpoint update indication to be transmitted to a second computing device. The 3D model may be rendered on a display device at the second computing device according to the modified viewpoint and the model data, in an embodiment.

In an embodiment, one or more tangible, non-transitory computer-readable media for facilitating a real-time shared viewing experience in a three-dimensional (3D) modeling environment includes computer-executable instructions stored thereon and executable by one or more processors to receive a local viewpoint modification indication indicating that a viewpoint of a three-dimensional (3D) model has been locally modified at a first computing device. The 3D model may correspond to model data including component data corresponding to a plurality of respective components of the 3D model, and the component data may include element data representing a plurality of respective sets of edges and faces corresponding to the plurality of respective components. The viewpoint of the 3D model may correspond to a positioning of a rendering of the 3D model relative to a plane of a display device at the first computing device, in an embodiment, and the rendering may be based on the model data. In an embodiment, the instructions are further executable to generate, in response to the received local viewpoint modification indication, a viewpoint update indication descriptive of the modified viewpoint, and to cause the viewpoint update indication to be transmitted, via the second connection, to a second computing device. The 3D model may be rendered on a display at the second computing device according to the modified viewpoint and the model data.

In an embodiment, an apparatus for facilitating a real-time shared viewing experience in a three-dimensional (3D) modeling environment includes a memory and computer-executable instructions stored thereon. The memory may store model data corresponding to a three-dimensional (3D)

model, including component data that corresponds to a plurality of respective components of the 3D model. The component data may include element data representing a plurality of respective sets of edges and faces corresponding to the plurality of respective components, in an embodiment. The computer-executable instructions may be executable by one or more processors to generate, based on a user-initiated command, a local viewpoint modification indication indicating that a modification to a local version of a viewpoint of the 3D model has occurred, where the viewpoint of the 3D model corresponds to a positioning of a rendering of the 3D model relative to a plane of a display device, and the rendering is based on the model data. In an embodiment, the computer-executable instructions are further executable by one or more processors to cause the local viewpoint modification indication to be transmitted via a network connection to a computing device.

DETAILED DESCRIPTION

Figure 1:
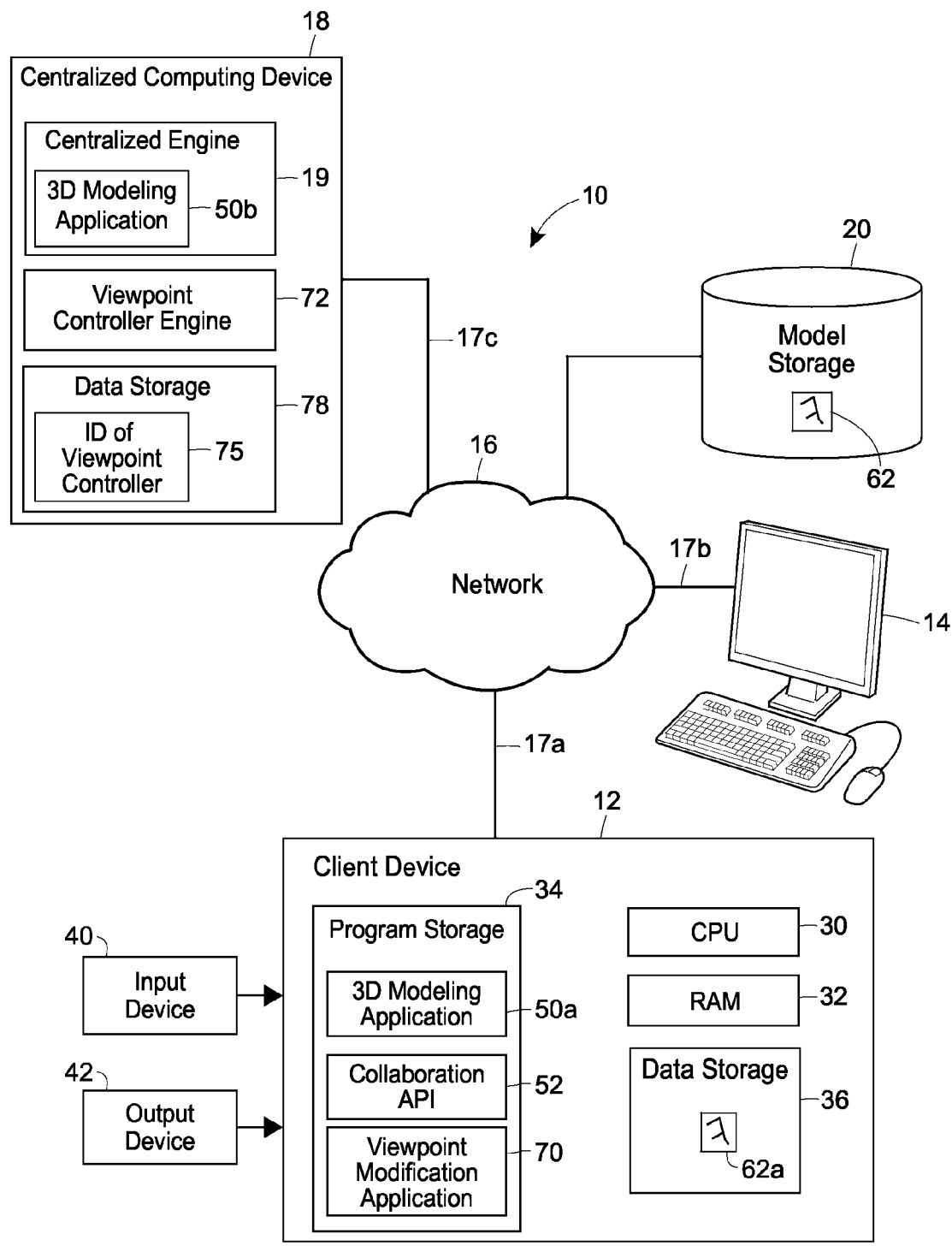
FIG. 1 is a block diagram of a communication system that provides, to multiple users, a real-time shared viewing experience of a three-dimensional (3D) model of an object or a group of objects.

In embodiments described below, a three-dimensional (3D) model development system or environment that provides a shared viewing experience permits multiple users to use respective client devices operating on a local area network (LAN) or a wide area network (WAN) to jointly view models of various objects such as, for example, buildings, vehicles, and items of furniture. In some embodiments, the 3D model development system or environment is a collaborative system or environment that permits multiple users to jointly develop a same 3D model essentially simultaneously (e.g., during a same time interval). The client devices, which may be personal computers (PCs), may include 3D modeling software which the corresponding users operate to create and edit 3D models or components of the models. In some embodiments, the 3D modeling software includes built-in functionality that allows users to invite other users to participate or collaborate in the development of a model and that propagates updates to models or components to the participating users. In other embodiments, 3D modeling software supports interactions with a 3D model only on an individual computing device, and the collaborative development system includes a software component (e.g., a plug-in) that extends the functionality of the 3D modeling software so as to permit collaboration with another computing device.

In embodiments where the development system is collaborative, the 3D model development system may provide collaborative functionality via an application programming interface (API), according to an embodiment. The API may allow users to select various mechanisms for resolving or preventing conflicts between concurrent edits, such as locking function. The API may also include a function for generating a description of the modifications applied to the component in terms of an operational transformation (OT) that allows client devices to modify the same component in parallel without locking the component, for example, by generating a serialized representation of the component, i.e., an ordered listing of the elements included in the component that allows the API to precisely indicate to which of the elements in the component a transformation has been applied.

Additionally, in the collaborative 3D model development system or environment, a collaboration server operates on a communication network to facilitate interactions with models between several client devices, according to an embodiment. The collaboration server may resolve conflicts between concurrent operations by several users or propagate updates to models to client devices for local conflict resolution, depending on the embodiment.

An example of a collaborative 3D modeling development system or environment including the above described client devices, API, and collaboration server in which the techniques described herein may be implemented is found in U.S. application Ser. No. 13/169,705, entitled "Collaborative Development of a Model on a Network" and filed Jun. 27, 2011, the entire disclosure of which is incorporated by reference herein.

In such a system and in other suitable systems, e.g., a 3D modeling system without collaborative development, a first user may desire to modify a viewpoint of the rendering of the 3D model and share the modified viewpoint with other users so that other users are able to see what the first user is seeing in real-time. The term "viewpoint," as used herein, may include a perspective or positioning of a rendering of a 3D model with respect to a plane of a display device. For example, viewpoints of a 3D model of a house may include a view, perspective, or elevation of the house from the east, a view, perspective, or elevation of the house from the north, a view of the house at a corner where two external walls meet, a close-up of a ridge where several rooflines meet, etc. Viewpoints, however, are not required to be static. In another example, viewpoints of a rendering of a chair may include a continuum of perspectives or views of the chair similar to those seen by a person as he or she walks around the chair or turns it upside down and around. Generally, a viewpoint may correspond to a view of a 3D model provided by a virtual camera that is moved through any points of a three-dimensional space surrounding the 3D model. As such, a viewpoint may be modified by changing a position, an orientation, a zoom degree, an angle, and/or other characteristics of the 3D model, similar to changing characteristics and viewing perspectives that can be provided by a camera.

For multiple users to share a real-time viewing experience of a 3D model, a first user at a respective client device may modify the viewpoint of the 3D model, and the viewpoint modification may be automatically propagated to the other users, in an embodiment. Depending on the embodiment, the viewpoint modification is propagated directly to one or more client devices or to a server that in turn propagates the viewpoint modification to the one or more client devices. In this manner, rather than asking the other users (e.g., via cumbersome mechanisms such as a telephone or chat message) to look at a particular aspect of a particular component of the model, the first user may obtain control of a "virtual camera" and may manipulate or modify the viewpoint provided by the virtual camera in real-time to easily and directly show other users the location that the first user has in mind. In an example with the aforementioned chair, the first user may rotate the viewpoint of the 3D model of the chair to show the underside of the seat, and then may zoom in to show a particular fastener used in a particular corner of the seat. These changes or modifications in viewpoint may be automatically propagated to the other collaborating users, so that the viewpoint of the 3D model on each of the computing devices used by respective other users may be congruent or consistent in real-time with the viewpoint that is being displayed on the computing device used by the first user. As such, the other users may share the viewpoint of the first user in real-time, and communication and/or development may be enhanced, efficient and productive. In some embodiments, only one of multiple collaborating users (or only one of the multiple computing devices used by the multiple users) may control the viewpoint modification of the 3D model (e.g., control of the "virtual camera") at a time to avoid conflicts.

Next, an example communication system 10 for sharing a real-time viewing experience in a 3D modeling environment is discussed with reference to FIG. 1. In an embodiment, the system 10 is implemented in a collaborative, 3D modeling environment. By way of example, viewpoint modification techniques are discussed below in relation to three-dimensional (3D) models such as those used by architects, engineers, and hobbyists. However, these or similar techniques also may be applied to two-dimensional (2D) drawings and other types of data.

Referring to FIG. 1, in an embodiment, a communication system 10 includes a first computing device 12, a second computing device 14 that operates independently of the computing device 12, and a communication network 16 to which the computing devices 12 and 14 are communicatively coupled via respective network connections 17a, 17b. In some embodiments, other computing devices (not shown) may also be communicatively coupled to the network 16. Although the computing devices 12 and 14 include similar hardware, software, and/or firmware components, for ease of illustration, the components of only the computing device 12 are shown in FIG. 1. In operation, a user operating the computing device 12 develops a model of an object or a group of objects. In some embodiments, the user operating the computing device 12 develops the model in collaboration with another user operating the client device 14.

The communication system 10 may also include a centralized computing device 18 in which a centralized engine 19 serves as a central repository and provider of 3D modeling functionality to various computing devices 12, 14 in the system 10. In embodiments where collaborative development is supported, the engine 19 may be a collaborative engine 19 that facilitates interactions between the computing devices 12 and 14. The centralized computing device 18 may include hardware, software, and/or firmware components similar to the computing devices 12 and 14, in an embodiment. The centralized engine 19 may include a set of computer-executable instructions that are executable by a processor of the collaboration computing device 18 and are stored in non-transitory, tangible program storage. The centralized computing device 18 may be coupled to the computing devices 12 and 14 via a network connection 17c and the communication network 16. In an embodiment, the computing device 12 and the computing device 14 are client devices, and the centralized computing device 18 is a server, although other embodiments are also possible (e.g., the computing devices 12, 14 and 18 are peer computing devices, etc.). However, for ease of discussion only (and not for limitation purposes), the techniques described herein generally refer to computing devices 12 and 14 as client devices 12 and 14 and to the centralized computing device 18 as the centralized server 18. In embodiments that support collaborative development, the centralized server 18 may be a collaboration server 18, and the centralized engine 19 may be a collaboration engine 19.

The communication network 16 may include, for example, a local area network (LAN) and/or a wide area network (WAN). In some embodiments, the network 16 may be a public network (e.g., the Internet), and in some embodiments the network 16 may be a private network (e.g., a password-protected and/or firewall-protected LAN). In some embodiments, the network 16 may be a combination of one or more private networks and one or more public networks. The communication network 16 may utilize any number of suitable wired or wireless networking technologies, such as (but not limited to) Ethernet, Internet Protocol (IP) or other types of packet networking, IEEE 802.11 standard compatible, client/server, cloud computing, peer-to-peer, etc.

The client device 12 in some embodiments includes a central processing unit (CPU) 30 to execute computer-readable instructions, a random access memory (RAM) unit 32 to store data and instructions during operation, program storage 34 including persistent memory to store software applications, shared software components such as Dynamic-link Libraries (DLLs), and other programs executed by the CPU 30, and data storage 36 including persistent memory to store data used by the programs stored in the program storage 34. By way of example, the program storage 34 and the data storage 36 may be implemented on a hard disk drive (HDD) coupled to the CPU 30 via a bus. Generally, the program storage 34 and the data storage 36 may be implemented on one or more non-transitory, tangible computer-readable storage mediums. In fact, the components 30, 32, 34, and 36 may be implemented in any suitable manner.

In the example implementation of FIG. 1, the client device 12 is a personal computer (PC). However, in general, the client device 12 may be any suitable stationary or portable computing device such as a tablet PC, a smart phone, etc. Although the computing device 12 in the example of FIG. 1 includes both storage and processing components, the client device 12 in other embodiments can be a so-called thin client that depends on another computing device for certain computing and/or storage functions. For example, in one such embodiment, the data storage 36 and the program storage 34 are external to the computing device 12 and are connected to the client device 12 via a network link. Further, the client device 12 may be coupled to an input device 40 and an output device 42. The input device 40 may include, for example, a pointing device such as a mouse, a keyboard, a touch screen, a trackball device, a digitizing tablet, or a microphone, and the output device 42 may include an LCD display monitor, a touch screen, or another suitable output device. Using the input device 40 and the output device 42, a user can access a graphical user interface (GUI) of the client device 12.

In an embodiment, the communication system 10 includes a model database storage 20 to store model data corresponding to various 3D models. Similar to the data storage 36, the model storage device 20 may be implemented on one or more non-transitory, tangible computer-readable storage mediums. The model storage device 20 of the system 10 may be accessed by the client device 12 via the network 16, as illustrated in FIG. 1. In some embodiments, however, the model storage device 20 may be at least partially included in local data storage 36 of one or more client devices 12, 14. The model storage device 20 may include one or more physical data storage devices that are networked and are externally perceived as a single logical data storage device (e.g., a data bank, a multiple disk or other mass storage system, cloud data storage, or any other known data storage technology).

With continued reference to FIG. 1, the program storage 34 may store a 3D modeling application 50a for developing 3D models of various objects. The 3D modeling application 50a includes a set of compiled instructions that are executable on the CPU 30 and that are stored in program storage 34, according to some embodiments. In one such embodiment, the 3D modeling application 50a is a stand-alone application independently executable by the CPU 30. In another embodiment, the 3D modeling application 50a is provided as a component (e.g., a plug-in) that extends the functionality of another software application such as a web browser, for example. In still other embodiments, the 3D modeling application 50a includes a set of instructions in a scripting language that are interpretable by another application, such as a web browser, at runtime.

Generally speaking, the 3D modeling application 50a provides a set of modeling controls to a user, so the user may create 2D and 3D shapes out of sets of basic, unitary elements such as edges and faces (also referred to herein respectively as lines and surfaces). In some embodiments, the 3D modeling environment allows a user to create 3D shapes from sets of 2D, orthographic projections and/or from basic, unitary 3D elements such as spheres, cubes and parallelepipeds. Each basic, unitary element may be user-editable over a continuum of dimensionalities, textures, and/or other characteristics, and may be user-editable across a set of affine manipulations, e.g., transformations which preserve collinearity such as translation, rotation, and reflection in an axis. For example, a user may stretch a set of edges and skew a face to form a plane representing half of a building's roof. The user may then copy the plane and reflect the copy to form the representation of the opposite half of the roof.

A user may combine and/or edit basic, unitary elements to form more complex 3D components by using the 3D modeling application 50a. For example, a user may define a wall from six faces and twelve edges. In another embodiment, the user may define a wall by shaping (e.g., through stretching, skewing, etc.) a basic parallelepiped element. Additionally, the user may use the 3D modeling application to define a model by combining a set of components and, optionally, from additional edges and faces. For example, a user may copy the wall component six times and arrange the copies of the wall component to form a room. Both components and models may be stored for re-use and copying (e.g., in the data storage 36), in an embodiment of the 3D modeling application 50a. The 3D modeling application 50a further may allow a user to position one or more elements, component and models, to variously adjust characteristics of one or more elements, component and models such as size and orientation, to apply textures to the shapes or one or more surfaces, to define one or more interactions between one or more shapes, and the like.

Components developed using the 3D modeling software 50a may be stored on the data storage 36 or the model storage 20 as data files including component data that conforms to a certain non-image format. The component data for a particular component may include element data that also conforms to the non-image format and represents the edges and faces that form the particular component. Similarly, models developed using the 3D modeling software 50a may be stored on the data storage 36 or the model storage 20 as data files including model data that conforms to the non-image format. For example, the non-image format of model data for a 3D model may specify a set of faces of the 3D model along with the corresponding attributes, such as the position and orientation of a face, the texture of the face, etc. In an embodiment, the model data may include an indication of an author of the model. Further, model data may be represented with a hierarchical tree data structure with branches on two or more levels describing respective components. An example tree data structure that may be used to store model data is discussed in more detail with reference to FIG. 3.

In embodiments where the 3D modeling application 50a supports collaborative development, the 3D modeling application 50a includes an interface via which certain functionality and data structures of the 3D modeling application 50a are made accessible to other programs, so that the functionality of the 3D modeling application 50 may be extended to include additional features. In an embodiment, a collaboration Application Programming Interface (API) 52 provides collaboration capability to the 3D modeling application 50a, so that a user operating the client device 12 and another user operating the client device 14 can develop a 3D model together during essentially the same time interval. The collaboration API 52 may include functions for inviting collaborators, generating component modification updates, locking and unlocking components for conflict-free editing, generating a representation of a component in a serialized format for sharing with another client device, etc.

In some embodiments, rather than the 3D modeling application 50a locally providing a set of modeling operations, commands, and/or other previously discussed 3D modeling functionality at the client device 12, the local 3D modeling application 50a instead provides access to a 3D modeling application 50b, such as on a website server, website hosting location, computing cloud, centralized server 18, or other type of virtual server. In some embodiments, the remote 3D modeling application 50b is included in the centralized engine 19 as shown in FIG. 1. Alternatively, in some embodiments, the remote 3D modeling application 50b is a separate entity from the centralized engine 19 (not shown).

The local 3D modeling application 50a and the remote 3D modeling application 50b may together provide the set of modeling operations, commands and/or other previously discussed modeling functionality to a user of the client device 12, whether for collaborative development with other users, or for stand-alone development. For example, the local 3D modeling application 50a may enable a user of the device 12 to access modeling commands provided by the remote 3D modeling application 50b via a web browser, an API (Application Program Interface), or other type of remote access application. In some embodiments, the local 3D modeling application 50a may be downloaded from the server 18. As used herein, for clarity, the term "3D modeling application 50" is used to denote the 3D modeling functionality provided by embodiments where the 3D modeling application 50a is used in a stand-alone mode at the client device 12, and/or embodiments where the 3D modeling application 50a operates in conjunction with the remote 3D modeling application 50b.

In embodiments where the system 10 supports collaborative development, the data storage 36 and the model storage 20 may store model data 62 that describes a same 3D model that is being collaboratively developed at the client devices 12 and 14. In some embodiments, each of the client devices 12 and 14 maintains a respective copy of model data 62. In one such embodiment, the client devices 12 and 14 exchange real-time or periodic updates describing modifications to the model data 62 at the corresponding client device, so that the 3D modeling application 50a executing on the client device can appropriately update the local copy of the model data 62. In other embodiments, the collaboration server 18 additionally or alternatively updates a "master" copy of the model 62, stored in the model storage 20, according to the updates received from the client devices 12 and 14.

With further regard to FIG. 1, the program storage 34 may store a viewpoint modification application 70 for modifying a viewpoint of a 3D model, such as the 3D model corresponding to model data 62. The viewpoint modification application 70 may include computer-executable instructions that are executable by the processor 30 to receive a user initiated command to modify a viewpoint of the 3D model that is rendered on the output device 42. In the embodiment illustrated in FIG. 1, the viewpoint modification application 70 is shown as an entity separate from both the 3D modeling application 50a and the collaboration API 52, but in some embodiments, at least a portion of the viewpoint modification application 70 may be included in at least one of the 3D modeling application 50a or the collaboration API 52, if available.

The user-initiated command to modify the viewpoint of the 3D model may be generated at the input device 40 during any stage of development of the 3D model. For example, the user-initiated command may be generated by keyboard entry, mouse action, touch screen, or any other suitable user input mechanism. The user-initiated command may include one or more commands to change a position, an orientation, a degree of zoom, an angle, and/or other characteristic of the rendering of the 3D model with respect to a plane of the output device 42 on which the 3D model is rendered.

Upon reception of the user-initiated command at the viewpoint modification application 70, the viewpoint modification application 70 may modify the viewpoint of the 3D model accordingly and the updated viewpoint may be displayed on the output device 42. Additionally, based on the local modification of the viewpoint, the viewpoint modification application 70 may generate an indication of the local viewpoint modification and may cause the indication to be transmitted over the network 16 to the centralized server 18, such as by using a web-browser or some other suitable connection. The local viewpoint modification indication may include indications of the specific local viewpoint modifications performed at the client device 12. In some embodiments, the indications of the specific modifications to the viewpoint are represented within the local viewpoint modification indication in a serialized format.

In an embodiment, the local viewpoint modification indication is received at a viewpoint controller engine 72 at the centralized server 18. The viewpoint controller engine 72 may include compiled instructions executable by a processor of the centralized server 18 and stored on a non-transitory, tangible computer-readable medium that is accessible to the centralized server 18. In some embodiments, the viewpoint controller engine 72 may be a separate entity from the centralized engine 19, such as illustrated in FIG. 1. In some embodiments, the viewpoint controller engine 72 may be included in the centralized engine 19 (not shown). Generally, the viewpoint controller engine 72 coordinates viewpoint modifications of 3D models between client devices 12, 14 in the system 10, so that viewpoints between client devices 12, 14 may be shared in real-time.

Upon reception of the local viewpoint modification indication, the viewpoint controller engine 72 may generate a viewpoint update indication descriptive of the modified viewpoint. For example, the viewpoint update indication may include information corresponding to the local viewpoint changes made at the client device 12. In some embodiments, the modifications to the viewpoint are represented within the viewpoint update indication by using a serialized format. The viewpoint update indication may also include an identity of the client device at which the local viewpoint modifications were made (in this example, client device 12). The viewpoint controller engine 72 may cause the viewpoint update indication to be transmitted to all client devices that share a viewpoint of a common rendering of the 3D model on their respective local displays.

In some embodiments, the system 10 is implemented so that only one user or client device at a time may have control of viewpoint modification of the 3D model corresponding to model data 62. In these embodiments, the viewpoint modification application 70 may include computer-executable instructions that are executable to request a reservation for the client device 12 to control the viewpoint modification or virtual camera for the 3D model. The client device 12 may transmit the reservation request to the viewpoint controller engine 72. Only after control is granted by the viewpoint controller engine 72 does the client device 12 allow a user to manipulate or modify the viewpoint of the 3D model, in an embodiment. The viewpoint controller engine 72 may manage control reservation requests from multiple clients 12, 14 and may prevent other client devices from reserving or obtaining control of the viewpoint modification or virtual camera of the 3D model until a release indication has been received from a controlling client device. Control of viewpoint modification may be granted by the viewpoint controller application 72 on a per 3D model basis, or may be globally granted (e.g., for all 3D model data files that are open for edit or development at the same time).

Conversely, the viewpoint controller engine 72 may notify the client device 12 when another client device 14 has been granted control of the viewpoint modification or virtual camera of the 3D model, and has made viewpoint modifications. As such, the viewpoint modification application 70 may include computer-executable instructions that are executable to receive a viewpoint update indication indicating that another client device has remotely modified a viewpoint of the 3D model, e.g., a remote version of the viewpoint of the 3D model was modified. Upon reception of the viewpoint update indication, the viewpoint modification application 70 may modify the local viewpoint of the 3D model on the output device 42 in accordance with the viewpoint modification information included in the viewpoint update indication. Still further, the viewpoint modification application 70 at the client device 12 may prevent from allowing a local modification of the viewpoint to be made, and may refrain from sending corresponding local viewpoint modification indications until the client device 12 is granted control of the virtual camera.

Figure 2:
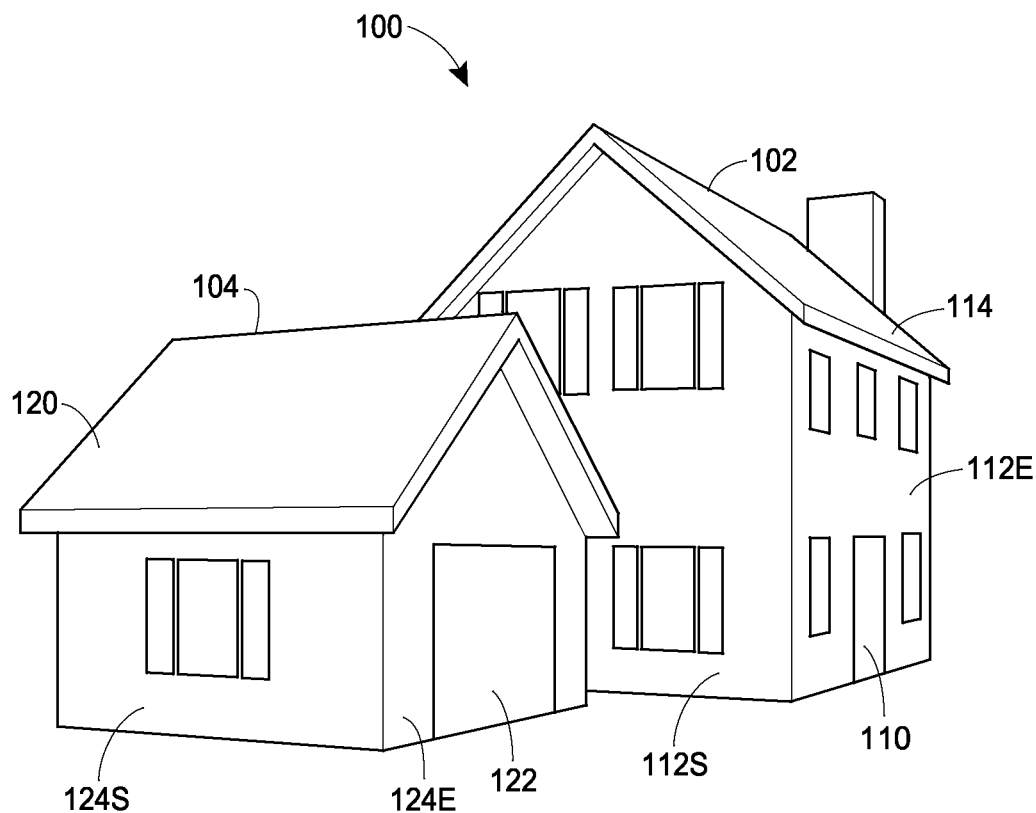
FIG. 2 is a rendering of an example 3D model whose viewpoint may be shared in real-time by users operating separate client devices of the communication system of FIG. 1.

To consider an example scenario illustrating a real-time shared viewing experience with reference to FIGS. 1-4, user Gail operating the client device 12 begins to develop a 3D model such a model 100 illustrated in FIG. 2. User Gail initially is a single developer of the model 100. Gail may enter commands at the user interface 40 of the client device 12, and the 3D model application 50 may operate in accordance with the entered commands to generate the model 100. As can be seen in FIG. 2, the model 100 includes a house component 102 and a garage component 104. Each of the components 102 and 104 in turn may include several sub-components. For example, the house component 102 includes a door 110, walls including a southern wall 112S and an eastern wall 112E visible in FIG. 2, and a roof 114, while the garage component 104 includes a roof 120, a door 122, and walls including a southern wall 112S and an eastern wall 112E visible in FIG. 2. As also can be seen in FIG. 2, the model 100 may include other components such as windows and a chimney, for example, the discussion of which is omitted for ease of illustration. According to one embodiment, each of the components illustrated in FIG. 2 is made up of one or more elements such as 3D geographic shapes: cuboids, spheres, pyramids, etc. In another embodiment, the components of FIG. 2 may be generated using groups of two-dimensional faces: squares, circles, triangles, etc.

According to one embodiment, the 3D modeling application 50 generates components of the model 100 according to commands received from user Gail. For example, to draw the roof 120, Gail may draw multiple shapes and group the shapes using the user interface of the 3D modeling application 50 (e.g., by selecting several shapes with a mouse and activating an icon for generating a group of selected shapes). In general, a model can have nested components at multiple levels. For example, Gail may first group several shapes to define a window frame component, and then Gail may group the window frame component with several 3D shapes to define a window component, create several instances of the window component, and group these several instances into a larger "multiple windows" component. Further, in some embodiments, the 3D modeling application 50 may allows users such as Gail to first define components as groups including multiple 3D shapes (and possibly other components) and then generate multiple instances of the defined component. When a user later edits an instance of a component, the changes are automatically applied to other instances of the component, according to an embodiment.

Figure 3:
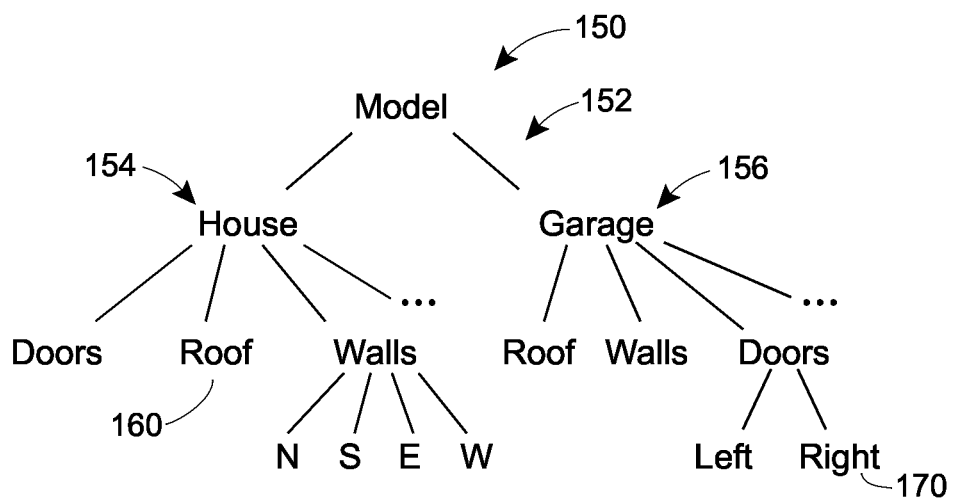
FIG. 3 is a diagram of an example data structure storing model data that describes the model of FIG. 2.

FIG. 3 is a schematic diagram of an example data structure 150 corresponding to the model 100, which the 3D modeling application 50 may generate when user Gail groups the shapes in the manner outlined above. After Gail creates the model 100, the 3D modeling application 50 initially may store model data 62 including the data structure 150 in the data storage 36. The data structure 150 includes a root node 152, a house branch 154, and a garage branch 156. Each of the branches 152 and 156 stores a particular component of the model 100. Further, the house branch 154 includes a roof branch 160 that corresponds to the roof component 114 as well as other branches corresponding to other components (a doors component, a walls component, etc.). As can be seen in FIG. 3, the garage branch 156 includes, among other branches, a doors branch with a right-door branch 170 that corresponds to the component 122. The right-door branch 170 may specify the component 122 as a set of 3D shapes, texture and/or color information, animation data, and other data. In general, a component may include drawing data, non-drawing data (text labels, metadata), and other components that also may include drawing and non-drawing data. In addition to the data structure 150, the model data 62 may include other information (e.g., metadata) such timestamp information, user information, etc.

In an embodiment, the 3D modeling application 501 or the collaboration API 52 utilizes the data structure 150 to represent a selected component of the model 100 in a serialized format. Generally speaking, by generating a serialized representation of a component branch, a device operating in a collaborative development environment permits another device, such as a client device or a collaboration server, to properly resolve conflicts and address collisions between modifications submitted at several devices using OT techniques. A serialized representation of a branch may include a sequence of basic 3D shapes (cuboids, spheres, etc.) and/or 2D shapes formed from edges and faces that make up the corresponding component, in an embodiment.

As an additional example, collaborative OT-based development of a text document may be briefly considered and contrasted with development of a 3D model. If two users collaboratively edit version V of a string of text S, such as "This is modeling," modifications to the string can be easily expressed in terms of text editing commands (e.g., insert, delete, replace, etc.) applied at specific character positions within the string S. For example, a first user may wish to insert the world "collaborative" following the eighth byte of the string S according to version V, and a second user may replace the word "is" in fifth and sixth bytes of the same version of the string S with the word "was." If the command from the second user is applied to the string S first, the unmodified command from the second user is then applied to the wrong portion of the string S. However, the commands from the first user and the second user can be easily reconciled by modifying the index at which the new word is to be inserted (in this case, the index can be modified to indicate the ninth byte rather than the eighth byte). In fact, in the example above, regardless of the order in which the two uses submit modifications to the string S, the conflict between the two commands is easily resolved, if the version V to which the corresponding command is applied is known. Thus, modifications to documents in which data is represented linearly (e.g., text documents) or in terms of numbered cells (e.g., spreadsheets) can be concurrently performed using indexing relative to a known version of the document. It is noted that this approach is compatible with lock-based as well as lock-free collaborative development.

On the other hand, unlike text or spreadsheet data, the model 100 is not easily described in a linear manner. The 3D modeling application 50 and/or the collaboration API 52 may generate the data structure 150 to describe the model as a hierarchical tree structure and, when necessary, generate serialized descriptions of branches to report updates to other devices, for example. In a collaborative embodiment of the 3D modeling development system or environment 10 of FIG. 1, the system 10 may define a set of operations recognized at participating client devices, such that the operations may be described with reference to the serialized descriptions of component branches. For example, the set may include such operations as add, delete, move, and change an element, a component, or a characteristic of an element or a component (e.g., re-size or re-shape). Thus, an OT-based description of how a certain component branch has been modified at a client device may include an indication that a delete operation was performed on the first sub-component (such as a cuboid) and a resize operation was performed on the fourth component (such as a sphere) in the serialized listing of the component, to consider just one example.

Referring back to FIG. 1, Gail may then decide to invite another user, Stan, to edit or further develop the model in collaboration with Gail. To this end, Gail may activate a control provided by the 3D modeling application 50 and/or the collaboration API 52 (e.g., a toolbar icon or a button labeled "invite") to generate an invitation to Stan in the form of an electronic message transmitted over the network 16, for example. The 3D modeling application 50 and/or the collaboration API 52 may automatically prompt the user to supply a name for the model 100 and verify, using the collaboration server 18, whether the supplied name is unique. User Gail, for example, may name the model 100 GailsModel. In some embodiments, the 3D modeling application 50 and/or the collaboration API 52 then uploads the model data 62 to the model storage 20 automatically or in response to a corresponding command from Gail.

In the scenario considered above, the collaboration API 52 and/or the 3D modeling application 50 may transmit the invitation to the collaboration server 18 (and not directly to the client device 14). The collaboration server 18 then may include a link to the model data 62 and forward the invitation to the client device 14 that Stan is using. Once Stan receives, and attempts to process, the invitation, the copy of the 3D modeling application 50 executing on the client device 14 may verify that the collaboration API 52 (e.g., in the form of a plug-in) is installed on the client device 14. If the collaboration API 52 is not yet installed on the client device 14, the 3D modeling application 50 may automatically prompt Stan to download and install the collaboration API 52. To this end, the invitation (or the model data 62) may include a link to a location from which the collaboration API 52 may be retrieved. Once the collaboration API 52 is installed, a copy of the model 62 may be received directly from the client device 12 or from the model storage 20 for editing at the client device 14, so that the copy stored at the model storage 20 corresponds to a "master copy" which the collaboration server 18 maintains according to the updates received from the client devices 12 and 14. However, in other embodiments, the collaboration server 18 does not maintain a master copy, and each of the client devices 12 and 14 locally manages a local copy of the model data 62.

After Stan has accepted Gail's invitation, Stan may begin to work on the 3D model 100 using the client device 14 at the same time as Gail. For example, Gail may wish to modify the house component 102, while Stan may wish to edit the garage component 104. However, it is also possible that both Gail and Stan may decide to edit the same component of the model 100 at the same time. Further, Gail and Stan may wish to modify components corresponding to different branches of the data structure 150. For example, Stan may wish to add a tool shed as a new component of the model 100 while Gail continues to edit the house component 102. Stan's addition in this case may require that a new branch be added directly under the root node 152. Depending on the embodiment, Stan may lock the entire model 100 to add a new component, he may lock only the root component while allowing modifications to be applied to the house branch 154, or he may not apply a lock at all and instead rely on an OT technique or a similar methodology to apply changes to the model 100 in a lock-free manner. The collaborative development system of FIG. 1 may provide one or more of these or other mechanisms for avoiding or resolving conflicts between modifications applied at different client devices.

In an embodiment, the collaboration API of the device 112 generates a serialized representation of the branch that describes the component 102 that is updated. For example, the collaboration API generates a linear listing of the elements and/or sub-components of the component 102, so that the one or several modifications of the component 102 applied at the device 202 can be specified relative to the specific elements included in the component 102. In an embodiment, the serialized representation of a component branch 154 also may include an indication or description of modifications $M_1, M_2, \ldots, M_N$ applied to the elements and components that make up the component branch 154. The description of modifications conforms to an OT format, according to some embodiments. These and other serialized representations of components and modifications thereto may be transmitted by the client device 12 to the collaboration server 18, in an embodiment.

Referring back to FIG. 1, for example, the collaboration server 18 may update the copy of the model data 62 in the model storage 20. In other embodiments, the collaboration server 18 does not update a master copy of the model in storage 20, and merely forwards the modification information to other client devices for updating.

During any time of their collaborative development of the 3D model, Gail (via client device 12) or Stan (via client device 14) desire to gain control of the viewpoint modification of the 3D model. In an illustrative scenario where Gail first requests control, the viewpoint modification application 70 at the client device 12 may generate a request to reserve control of the viewpoint control of the 3D model, and may transmit the reservation request to the collaboration server 18 (e.g., the centralized server 18).

The viewpoint controller engine 72 at the collaboration server 18 may receive the reservation request from the client device 12, and may determine whether or not control of the viewpoint modification has been already granted to another client device, for example, by checking a memory location 75 in data storage 78 that is accessible to the collaboration server 18. Similar to the model data storage 20, the data storage 78 may be implemented on one or more non-transitory, tangible computer-readable storage mediums. In some embodiments, the data storage 78 is locally included on the collaboration server 18, such as illustrated in FIG. 1. In some embodiments, however, the data storage 78 may be at least partially included in model data storage 20.

The memory location 75 may maintain a record of an identification of a client device to which control of the viewpoint modification is currently granted. If control has already been granted to another client device, the viewpoint controller engine 72 may send a denial of the reservation request to the viewpoint modification application 70 at the client device 12. If, as indicated by the stored identification 75, control of the viewpoint modification of the 3D model is available, the viewpoint controller application 72 may send an indication that control of the viewpoint modification of the 3D model is granted to the client device 12. Upon reception of the grant, the viewpoint modification application 70 at the client device 12 may display an indication of the grant (e.g., a textual display such as "You now have control of the virtual camera" or visual change in a corresponding icon) and may allow Gail to locally modify the viewpoint of the 3D model.

Figure 4:
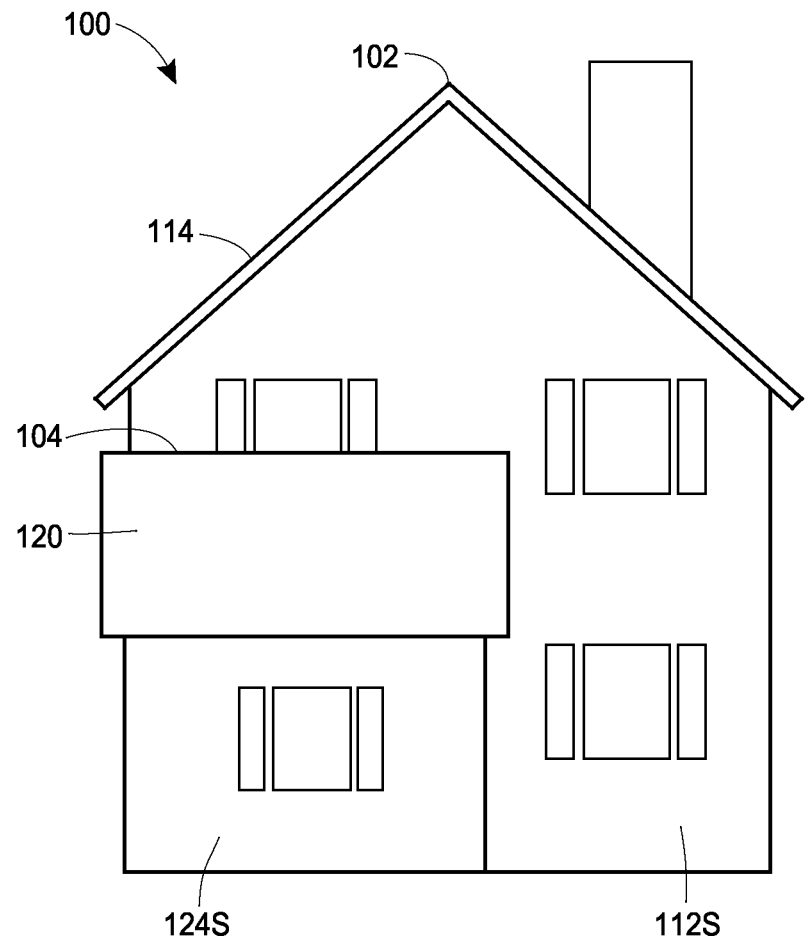
FIG. 4 is a rendering of the example 3D model of FIG. 2 after a viewpoint modification is applied.

In this scenario, user Gail has control of the virtual camera trained on the 3D model. FIG. 4 illustrates an example viewpoint 150 of the model 100 of FIG. 2 after Gail has made a viewpoint modification. In the viewpoint 150, Gail has rotated the viewpoint 100 to display the southern garage wall 124S. Further, Gail has zoomed in on the southern garage wall 124S. In response to Gail's modifications, a local viewpoint modification indication describing these modifications may be generated by the viewpoint modification application 70, and the viewpoint modification application 70 may cause the local viewpoint modification indication to be transmitted to the viewpoint controller engine 72. In an embodiment, the modifications to the viewpoint are described within the local viewpoint modification indication by a serialized format.

Upon reception of the local viewpoint modification indication, the viewpoint controller engine 72 may generate a viewpoint update indication descriptive of the modified viewpoint. In an embodiment, the viewpoint update indication may include information corresponding to the local viewpoint changes made at the client device 12, such as by using a serialized format. The viewpoint update indication may also include an identity of the client device at which the local viewpoint modifications were made (in this example, client device 12). The viewpoint controller engine 72 may cause the viewpoint update indication to be transmitted to all collaborating client devices (such as the client device 14, in this example).

When Gail wishes to release the virtual camera, she may indicate as such via the user interface 40. In response to Gail's input, the viewpoint modification application 70 may generate a release of control indication, and may cause the release of control indication to be transmitted to the viewpoint controller engine 72 at the collaboration server 18. Based on the received release indication, the viewpoint controller engine 72 may clear the identification of the client device 12 from the memory storage 75. The viewpoint controller engine 72 then may grant control of the viewpoint modification to a subsequently requesting computing device.

Although the preceding example included a scenario where two users (e.g., Gail and Bob) collaborate on the development of a 3D model, collaborative development is not required in every embodiment of a 3D modeling system that provides a shared real-time viewing experience. For example, using the techniques of the present disclosure, Gail may singly generate a 3D model and display the 3D model to Bob. Either Gail or Bob may gain control of the viewpoint modification and modify the viewpoint of the displayed 3D model, and these viewpoint modifications may be propagated to the other party in real-time using embodiments of the techniques discussed herein.

Figure 5:
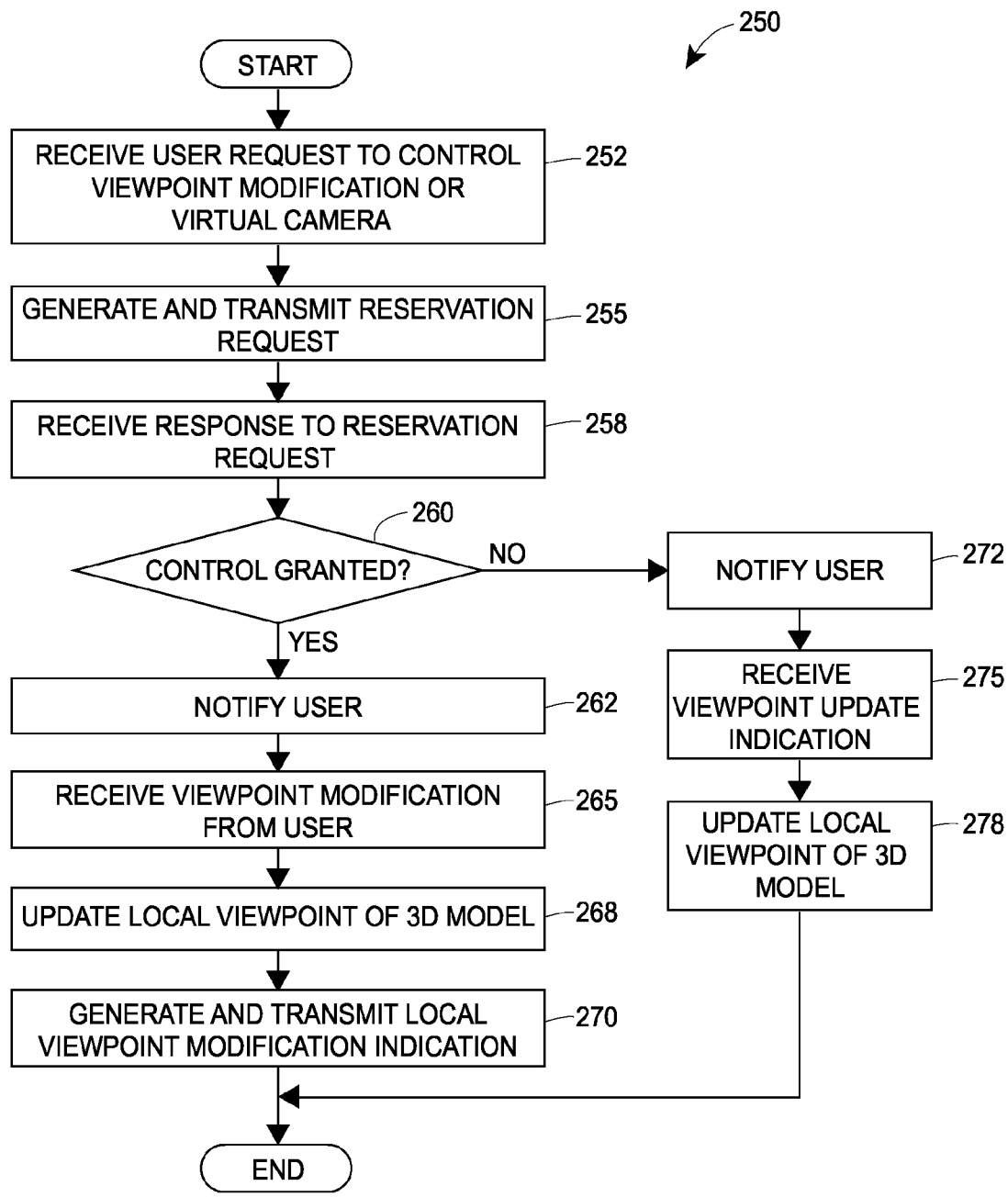
FIG. 5 is an example method for providing a real-time shared viewing experience in a 3D model development environment.
Figure 6:
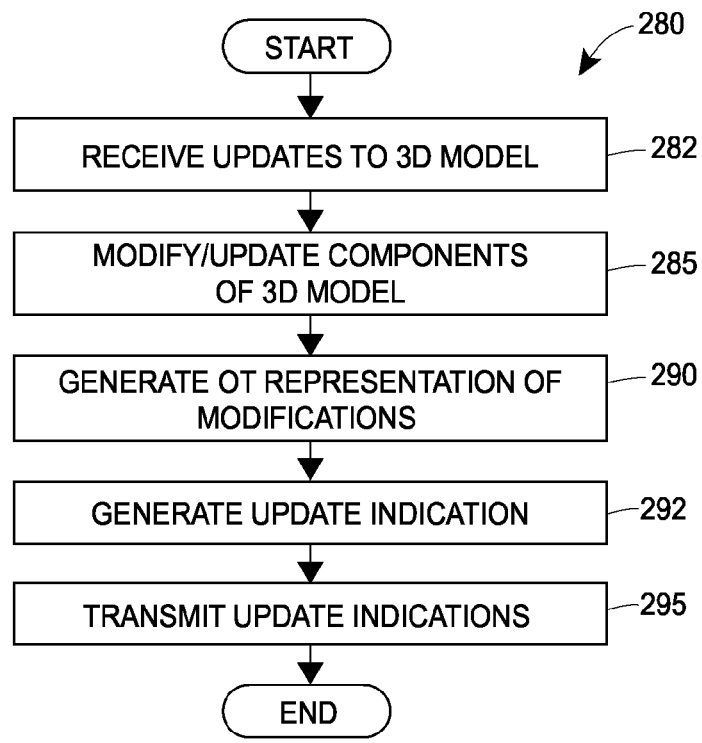
FIG. 6 is an example method for developing a 3D model whose viewpoint may be shared in real-time.
Figure 8:
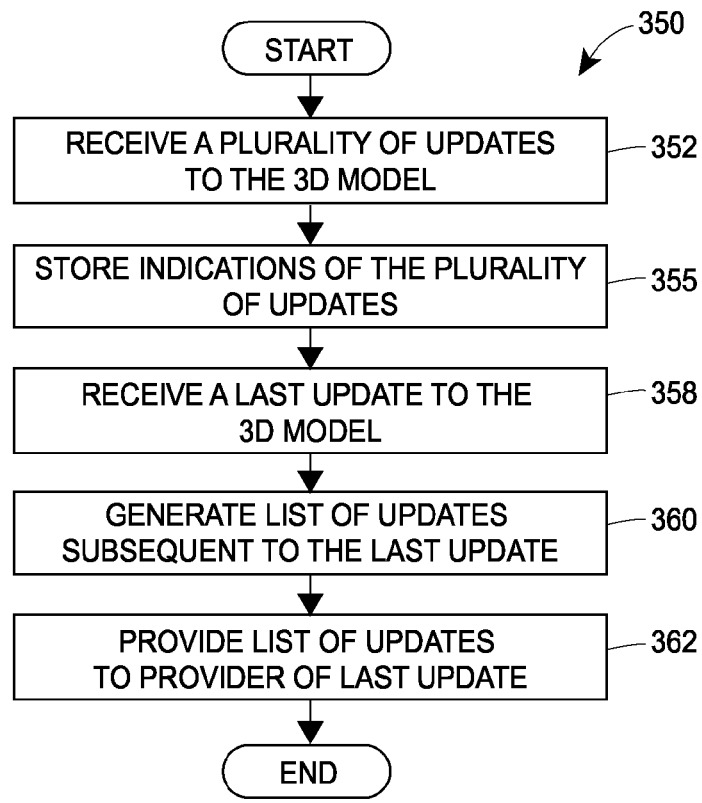
FIG. 8 is another example method for developing a 3D model whose viewpoint may be shared in real-time.
Figure 7:
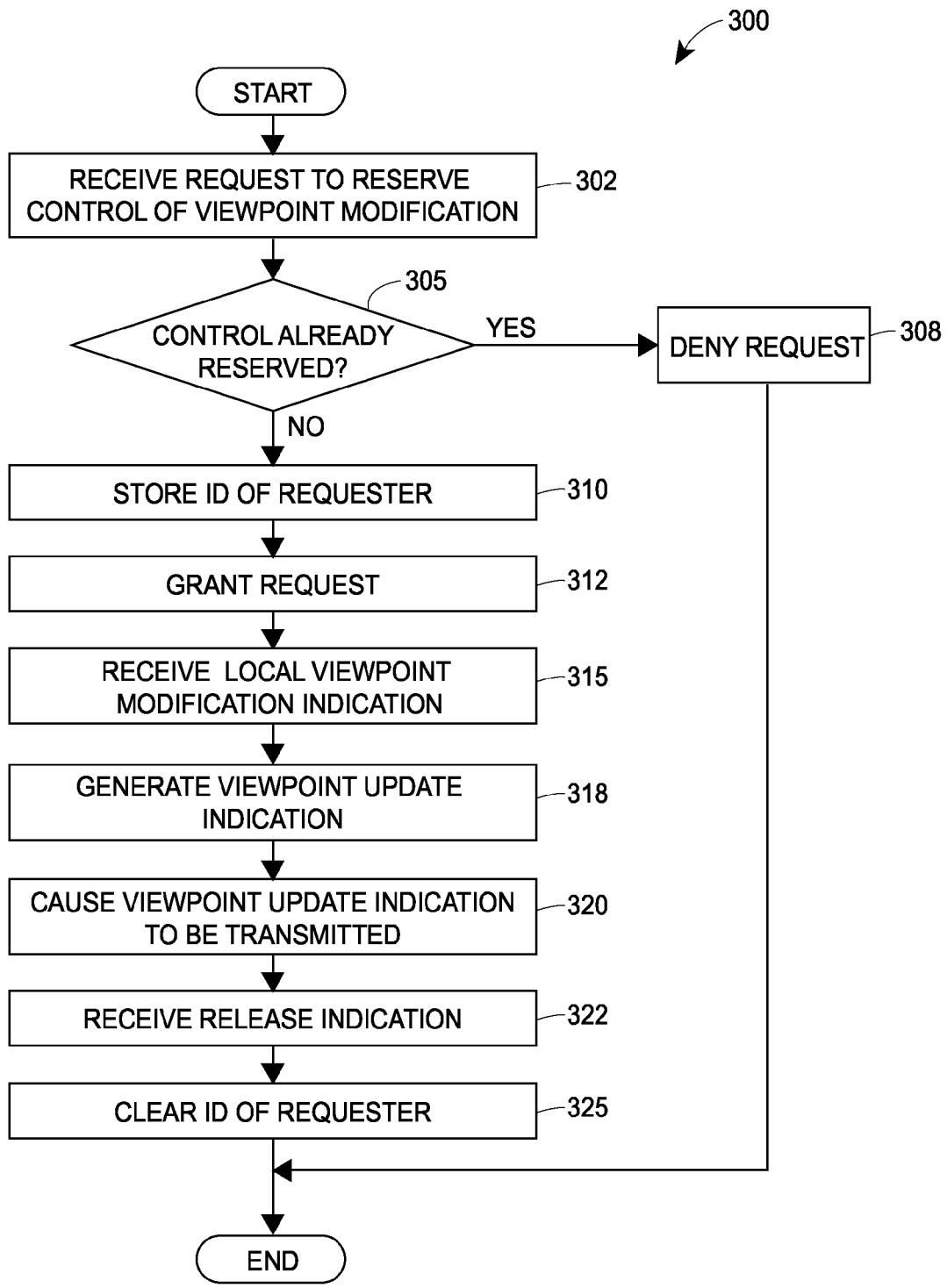
FIG. 7 is another example method for providing a real-time shared viewing experience in a 3D model development environment.

Next, several example methods that may be implemented in the communication system 10 or a similar 3D modeling environment to support real-time sharing of viewpoints are discussed with reference to FIGS. 5-8. For clarity, the descriptions of FIGS. 5-8 include references found in FIG. 1. In particular, FIGS. 5 and 6 illustrate flow diagrams of methods that can be implemented in a client device participating in real-time sharing of viewpoints of 3D models, and FIGS. 7 and 8 illustrate flow diagrams of methods that can be implemented in a centralized server operating on a network that provides real-time sharing of viewpoints of 3D models. In general, the methods of FIGS. 5-8 may be implemented using any suitable programming language and may be stored as instructions on a non-transitory, tangible computer-readable medium. The instructions may execute on one or several processors, and may include compiled code, instructions interpreted by another software application (e.g., modeling software, a browser), or in any other suitable manner.

FIG. 5 is an embodiment of a flow diagram of an example method 250 for facilitating real-time shared viewing at a client device operating in a 3D model development environment. For example, the method 250 may be implemented in the client device 12 (in one embodiment, the method 250 is implemented in the viewpoint modification application 70 or other suitable application).

At block 252, a user-initiated command or request to reserve control of the viewpoint modification of a 3D model is received. For example, the user-initiated request may be received via a user interface 42. At block 255, a reservation indication is generated in response to the user-initiated command, and the reservation indication is caused to be transmitted to a centralized server 18, in an embodiment.

At block 258, a response from the centralized server 18 may be received. Based on the response to the reservation request, if control of the viewpoint modification of the 3D model is granted to the client device (or to the user of the client device) as determined at the block 260, the user is notified as such (block 262). For example, a pop-up window or other text string may inform the user that he or she has control of the virtual camera or viewpoint modification for the 3D model, or an icon or other indicator may be visually or aurally differentiated at the output device 42.

At block 265, a user-initiated command to modify the viewpoint of the 3D model may be received. For example, the user-initiated command may include one or more instructions to change a position, an orientation, a degree of zoom, an angle, and/or other characteristic of the rendering of the 3D model with respect to a plane of the output device 42 on which the 3D model is rendered. At block 268, the local viewpoint at the client device is modified or updated based on the user-initiated command, and the resultant modified viewpoint is displayed on the output device 42, in an embodiment.

At block 270, a local viewpoint modification indication is generated and transmitted to the centralized server 18. The local viewpoint modification indication may include a representation of the specific local modification(s) made to the local viewpoint at the client device 12. In an embodiment, the representation of the specific local modifications includes serialized information based on the model data (such as shown in FIG. 3).

If, at the block 260, control of the viewpoint modification of the 3D model was determined to be denied, the user may be informed of the denial (block 272). For example, a pop-up window or other text string may inform the user that he or she does not have control of the virtual camera or viewpoint modification, and/or an icon or other indicator may be visually or aurally differentiated at the output device 42.

As another party has control of the virtual camera trained on the 3D model, at block 275, a viewpoint update indication may be received corresponding to a change made to a remote version of the viewpoint by the other party. The viewpoint update indication may represent the specific remote changes made to the remote version of the viewpoint as serialized data, and the viewpoint update indication may include an identification of the other party. Based on the received viewpoint update indication, at block 278, the local version of the viewpoint of the 3D model may be updated.

In some embodiments, the method 250 for providing a real-time shared viewing experience of a 3D model may be augmented by providing updates to the 3D model. In particular, the method 250 may be augmented by the method 280 for updating a 3D model illustrated in FIG. 6. For example, the method 280 may be performed before the block 252 of the method 250 of FIG. 5, or the method 280 may be performed after the block 270 or the block 278 of the method 250 of FIG. 5. In some embodiments, the method 280 of FIG. 6 may be implemented independently of the method 250 altogether. In some embodiments, the method 280 may be implemented in a collaborative, 3D modeling environment. For example, the method 280 may be implemented in the 3D modeling application 50*a* and the collaboration API 52, or in one or more other suitable applications.

With regard to FIG. 6, one or more users of the system 10 may decide to modify one or more components of the 3D model. In an embodiment, the one or more users may modify the one or more components of the 3D model. At block 282, one or more user-initiated update commands corresponding to desired component modifications may be received, such as via an input device 40. The component modifications may include, for example, adding a new component to the 3D model, deleting an existing component from the 3D model, changing a characteristic of an existing component (e.g., a size, a length, a width, a shape, etc.), or some combination thereof.

At the block 285, components of the 3D model may be modified in accordance with the received commands. For example, the rendering of the 3D model on the output device 42 may be modified in accordance with the received commands.

Next, at block 290, component data including an OT representation of the modified components may be generated. To this end, the techniques discussed above with reference to the previous figures may be used; and in particular, serialized representations of the components and their modifications (e.g., serialized component data based on the model data 62) may be generated. At block 292, an update indication that includes the OT representation may be generated, and at block 295, the update indication may be transmitted to the centralized server 18. The update indication generated at block 292 also may include other component data such a component identifier that uniquely identifies the component, for example.

FIG. 7 is an embodiment of a flow diagram of an example method 300 for facilitating real-time shared viewing at a client device operating in a 3D model development environment. In an embodiment, the 3D modeling development environment may be a collaborative, 3D modeling development environment. The method 300 may be implemented in the centralized server 18 or other suitable device, in an embodiment. For example, the method 300 may be implemented in the viewpoint controller engine 72 of the centralized server 18, the method 300 may be implemented in both the viewpoint controller engine 72 and the 3D modeling application 50*b* of the centralized server 18, or the method 300 may be implemented in another suitable application.

At block 302, a reservation request to gain control of a viewpoint modification of a 3D model or to gain control of a "virtual camera" trained on the 3D model may be received. In an embodiment, the reservation request may be received from a first client device, e.g., via a web browser, a message, or other suitable communication mechanism at a viewpoint controller engine 72 of the centralized server 18. A determination of whether or not control of the viewpoint modification is available is made at block 305, in an embodiment. If, at block 305, it is determined that another party currently has control of the viewpoint modification of the 3D model, the request may be denied (block 308). In some embodiments, the request denial transmitted to the requestor at the block 308 may include an indication of the party (whether another client device or another user) that currently has control of the viewpoint modification of the 3D model.

If, at the block 305, it is determined that control of the viewpoint modification is available to be granted, an indication that the control is assigned to the requesting party is stored (block 310). For example, an identification of the first client device or of the user of the first client device 75 may be stored in a data storage 78 that is accessible to the centralized server 18. An indication that the reservation request is granted may be transmitted or sent to the requestor (block 312).

At block 315, a local viewpoint modification indication may be received. In an embodiment, the local viewpoint modification indication is received at the viewpoint controller engine 72 from the first client device, e.g., via a web browser, a message, or other suitable communication mechanism. The local viewpoint modification indication may include information specifying one or more modifications that were applied to the local viewpoint of the 3D model at the first client device. In an embodiment, the one or more modifications are specified using a serialized data format, such as discussed with respect to FIG. 3.

At block 318, a viewpoint update indication may be generated. In an embodiment, the viewpoint update indication is generated by the viewpoint controller engine 72, and includes data corresponding to the information specifying one or more modifications to the viewpoint of the 3D model received in the local viewpoint modification indication. For example, the one or more modifications may be specified using a serialized data format. In an embodiment, information from more than one local viewpoint modification indication may be aggregated into a single viewpoint update indication. The viewpoint update indication may include an indication of the first client device or user of the first client device (e.g., an indication of the party or entity that originated the one or more modifications), in an embodiment.

At block 320, the viewpoint update indication may be caused to be transmitted to one or more other client devices in the system 10. For example, the viewpoint update indication may be sent via the network 16 to the client device 14. Upon reception of the viewpoint update indication, a receiving client device may update its local viewpoint of the local rendering of the 3D model in accordance with the one or more modifications indicated in the viewpoint update indication and the local copy of the model data 62.

Blocks 315-320 may be repeated any suitable number of times while the first client device (or user of the first client device) continues to modify the viewpoint of the 3D model. When the first client device or the user of the first client device desires to relinquish control of the viewpoint modification of the 3D model, a release indication indicating as such may be received from the first client device (block 322). Based on the received release indication, the identification of the first client device or of the user of the first client device as the controlling party of the viewpoint may be cleared from the corresponding memory storage location 75 (block 325).

At any point while the first client device (or user thereof) has control of the viewpoint modification of the 3D model (e.g., blocks 310-322), one or more other client devices (or one or more users of the respective client devices) may attempt to modify the viewpoint of the 3D model. For example, a reservation request may be received from a second client device or a local modification viewpoint indication may be received from the second client device. In these scenarios, an indication that the first client device (or user thereof) currently has control of the viewpoint modification of the 3D model may be caused to be transmitted to the second client device.

In some embodiments, the method 300 for providing a real-time shared viewing experience of a 3D model may be augmented by providing updates to the 3D model. In particular, the method 300 may be augmented by the method 350 for updating a 3D model illustrated in FIG. 8. For example, the method 350 may be performed any time while the first client device has control of the viewpoint modification (blocks 310-320). In some embodiments, however, the method 350 of FIG. 8 may be implemented independently of the method 300 altogether. The method 350 may be implemented in a collaborative, 3D modeling environment, in an embodiment. For example, the method 350 may be implemented in the 3D modeling application 50b at the collaboration server 18, or may be implemented in one or more other suitable applications.

At block 352, a plurality of updates to the 3D model may be received. The plurality of updates may be received over a period of time from two or more client devices, where the plurality of updates correspond to changes to the 3D model that are initiated by respective users who are collaborating on the development of the 3D model. Each of the updates may include, for example, an indication that a new component has been added to the 3D model, an indication that an existing component has been deleted from the 3D model, and/or an indication that a characteristic of an existing component of the 3D model has been modified or changed (e.g., a length, a size, a width, a color, a texture, etc.). In an embodiment, each update may include a serialized representation of components of the 3D model and the changes thereto, in a manner such as previously described with respect to FIG. 3. The plurality of updates may be received, in an embodiment, at the collaboration engine 19 of the collaboration server 18. At block 355, indications of the plurality of updates may be stored in a data storage location that is accessible to the collaboration server 18, for example, in data storage 78 or in data storage 20.

At block 358, a last or most recent update to the 3D model may be received. For example, the last update may be received via the network 16 from any of the two or more client devices from which the plurality of updates in block 352 were received, or the last update may be received via the network 16 from another client device.

Upon reception of the last update at the block 358, a list of updates subsequent to the last update may be generated (block 360). The list may be generated based on the indications of the plurality of updates that were stored at block 355, in an embodiment.

At block 362, the list of updates may be provided to the particular client device from which the last updated was received (block 358). For example, the list of updates may be caused to be transmitted from the collaboration server 18 to the particular client device via the network 16. In this manner, the particular client device may update a local copy 62 of the 3D model to include the modifications to the 3D model that were made subsequent to the last update at the particular client device.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing a real-time shared viewing experience for 3D modeling through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for facilitating a real-time shared viewing experience in a three-dimensional (3D) modeling environment, comprising:

receiving a reservation indication indicating that a first computing device requests a reservation for control of viewpoint modification of a 3D model;

storing, based on the reservation indication, an indication that the first computing device has the control of the viewpoint modification of the 3D model;

preventing a second computing device from reserving the control of the viewpoint modification of the 3D model until a release indication is received, the release indication indicating that the first computing device releases the control of the viewpoint modification of the 3D model;

receiving a local viewpoint modification indication indicating that a viewpoint of the 3D model has been locally modified at a first computing device, wherein:

the 3D model corresponds to model data including component data corresponding to a plurality of respective components of the 3D model, the component data including element data representing a plurality of respective sets of edges and faces corresponding to the plurality of respective components, and the viewpoint of the 3D model corresponds to a positioning of a rendering of the 3D model relative to a plane of a display device at the first computing device, the rendering based on the model data;

generating, in response to the received local viewpoint modification indication, a viewpoint update indication descriptive of the locally modified viewpoint; and transmitting the viewpoint update indication to the second computing device such that model data of the 3D model located at the second computing device, when rendered on a display device at the second computing device, is rendered in accordance with the locally modified viewpoint and a rendering of model data corresponding to the 3D model in accordance with the locally modified viewpoint is simultaneously displayed on the display device of the first computing device and the display device of the second computing device, wherein causing the viewpoint update indication to be transmitted is performed based on the indication that the first computing device has the control of the viewpoint modification of the 3D model.

2. The method of claim 1, wherein the local viewpoint modification indication is a first local viewpoint modification indication, the reservation indication is a first reservation indication, and preventing the second computing device from reserving the control of the viewpoint modification of the 3D model includes:

receiving at least one of a second local viewpoint modification indication indicating that the viewpoint of the 3D model has been locally modified at the second computing device, or a second reservation indication indicating that the second computing device requests the reservation for the control of the viewpoint modification of the 3D model, and causing, based on the receiving of the at least one of the second local viewpoint modification indication or the second reservation indication, the indication that the first computing device has the control of the viewpoint modification of the 3D model to be transmitted to the second computing device.

3. A method according to claim 1, wherein causing the viewpoint update indication to be transmitted to the second computing device includes causing the viewpoint update indication including an indication of the first computing device to be transmitted to the second computing device.

4. A method according to claim 1, further comprising:

receiving, from at least one of the first computing device and the second computing device, a plurality of updates to the 3D model, each update of the plurality of updates including a serialized representation of a respective component of the 3D model;

storing indications of the plurality of updates;

receiving, from a third computing device, an indication of a last update to the 3D model;

based on the stored indications of the plurality of updates, generating a list of updates to the 3D model that are subsequent to the last update; and causing the list of updates to be transmitted to the third computing device.

5. The method of claim 4, wherein the plurality of updates includes at least one of: an indication of an addition of a new component to the 3D model, or an indication of a deletion of an existing component of the 3D model.

6. A method according to claim 1, further comprising:

receiving a user command to modify at least one edge or face included in the 3D model; and updating the element data based on the user command.

7. One or more tangible, non-transitory computer-readable media for facilitating a real-time shared viewing experience in a three-dimensional (3D) modeling environment, comprising:

computer-executable instructions stored thereon and executable by one or more processors to:

receive a reservation indication indicating that a first computing device requests a reservation for control of viewpoint modification of a 3D model;

store, based on the reservation indication, an indication that the first computing device has the control of the viewpoint modification of the 3D model;

receive a local viewpoint modification indication indicating that a viewpoint of the 3D model has been locally modified at the first computing device, wherein:

the 3D model corresponds to model data including component data corresponding to a plurality of respective components of the 3D model, the component data including element data representing a plurality of respective sets of edges and faces corresponding to the plurality of respective components, and the viewpoint of the 3D model corresponds to a positioning of a rendering of the 3D model relative to a plane of a display device at the first computing device, the rendering based on the model data;

generate, in response to the received local viewpoint modification indication, a viewpoint update indication descriptive of the locally modified viewpoint; and transmit the viewpoint update indication to a second computing device such that model data of the 3D model located at the second computing device, when rendered on a display at the second computing device, is rendered in accordance with the locally modified viewpoint, and a rendering of model data corresponding to the 3D model in accordance with the locally modified viewpoint is simultaneously displayed on the display device of the first computing device and the display device of the second computing device, wherein the viewpoint update indication is caused to be transmitted to the second computing device based on the stored indication.

8. The one or more tangible, non-transitory computer-readable media of claim 7, wherein:
the local viewpoint modification indication is a first local viewpoint modification indication and the reservation indication is a first reservation indication; and
the computer-executable instructions are further executable to:
receive at least one of: a second local viewpoint modification indication indicating that the viewpoint of the 3D model has been locally modified at a third computing device, or a second reservation indication indicating that the third computing device requests the control of the viewpoint modification of the 3D model and
cause, based on the at least one of the second local viewpoint modification indication or the second reservation indication, an indication that the first computing device controls the viewpoint modification of the 3D model to be transmitted to the third computing device.

9. The one or more tangible, non-transitory computer-readable media of claim 7, wherein only a single computing device at a time is granted the control of the viewpoint modification of the 3D model.

10. The one or more tangible, non-transitory computer-readable media of claim 7, wherein the viewpoint update indication includes an indication of the first computing device.

11. The one or more tangible, non-transitory computer-readable media of claim 7, wherein the computer-executable instructions are further executable to:
receive, from at least one of the first computing device or the second computing device, a plurality of updates to the 3D model, each update of the plurality of updates including a serialized representation of a respective component of the 3D model, wherein the plurality of updates includes at least one of: an addition of a new component to the 3D model, a deletion of an existing component of the 3D model, or a modification to the existing component of the 3D model;
store indications of the plurality of updates;
receive an indication of a last update made to the 3D model;
use the stored indications of the plurality of updates to generate a list of updates to the 3D model that are subsequent to the last update; and
cause the list of updates to be transmitted to a particular computing device from which the indication of the last update was received.

12. The one or more tangible, non-transitory computer-readable media of claim 7, wherein the local viewpoint modification indication is received from a web browser at the first computing device.

13. An apparatus for facilitating a real-time shared viewing experience in a three-dimensional (3D) modeling environment, comprising:
a memory storing model data corresponding to a three-dimensional (3D) model, the model data including component data that corresponds to a plurality of respective components of the 3D model, and the component data including element data representing a plurality of respective sets of edges and faces corresponding to the plurality of respective components; and
computer-executable instructions stored on the memory and executable by one or more processors to:
generate a reservation indication to request a reservation for control of a viewpoint modification of the 3D model,
transmit the reservation indication from a first computing device to a computing device via a network connection,
receive an indication that the reservation for control of the viewpoint modification of the 3D model is granted,
generate, based on a user-initiated command, a local viewpoint modification indication indicating that a modification to a local version of a viewpoint of the 3D model has occurred, wherein the viewpoint of the 3D model corresponds to a positioning of a rendering of the 3D model relative to a plane of a display device of the first computing device, and the rendering is based on the model data, and
transmit the local viewpoint modification indication via the network connection to a second computing device such that a rendering of 3D model data according to the modified viewpoint is simultaneously displayed on the display device of the first computing device and a display device of another computing device.

14. An apparatus according to claim 13, wherein the local viewpoint modification indication is caused to be transmitted after the reservation indication is caused to be transmitted.

15. An apparatus according to claim 14, wherein the computer-executable instructions are further executable by the one or more processors to:
receive a viewpoint update indication indicating that a remote version of the viewpoint of the 3D model has been modified; and
modify the local version of the viewpoint based on the model data and the viewpoint update indication.

16. An apparatus according to claim 15, wherein the viewpoint update indication indicates an entity corresponding to an origination of the modification of the remote version of the viewpoint of the 3D model.

17. An apparatus according to claim 13, wherein the computer-executable instructions are further executable by the one or more processors to:
receive an indication that the control of the viewpoint modification of the 3D model is reserved; and
forgo, based on the indication that the control of the viewpoint modification of the 3D model is reserved, causing a second local viewpoint modification indication to be transmitted to the second computing device.

18. An apparatus according to claim 17, further comprising additional computer-executable instructions stored on the memory and executable by the one or more processors to:
receive an indication that a component modification has been applied to the plurality of respective components in accordance with a set of one or more modification commands received from a user interface;

generate, based on the model data, serialized component data indicative of the component modification; and cause the serialized component data to be transmitted to the second computing device.

19. An apparatus according to claim 13, wherein component modification includes at least one of:

an addition of a new component to the 3D model, a deletion of an existing component to the 3D model, or a change to a characteristic of the existing component of the 3D model.

20. An apparatus according to claim 13, wherein the network connection is provided by a web-browser.

* * * * *